Aug. 20, 1968  R. E. KLAUSS  3,398,248

CAM ACTUATOR

Filed July 7, 1967

RALPH E. KLAUSS
INVENTOR.

BY Malcolm G. Dunn
Robert W. Hampton

ATTORNEYS

United States Patent Office 3,398,248
Patented Aug. 20, 1968

3,398,248
CAM ACTUATOR
Ralph E. Klauss, Rochester, N.Y., assignor to Eastman Kodak Company, Rochester, N.Y., a corporation of New Jersey
Filed July 7, 1967, Ser. No. 651,824
6 Claims. (Cl. 200—153)

ABSTRACT OF THE DISCLOSURE

A reciprocating cam device for operating a movable element, such as a component of an electric switch, to position the element in one location during movement of the cam in one direction and in another location during movement of the cam in the opposite direction, with means being provided to maintain the element in the location in which it is so positioned while the cam moves through a corresponding predetermined portion of its movement path.

---

The present invention relates to a reciprocating cam device for operating a movable element, such as a component of an electric switch, to position the element in one location during movement of the cam in one direction and in another location during movement of the cam in the opposite direction, with means being provided to maintain the element in the location in which it is so positioned while the cam moves through a corresponding predetermined portion of its movement path.

The function of the subject arrangement, as previously recited, has in the past been accomplished by many different types of cam mechanisms in various types of machinery. However, such mechanisms have generally involved rather complicated and expensive mechanical structures or, in the case of cam controlled electric switches having this mode of operation, have utilized a plurality of electrical components comprising separate switches, relays or the like. Accordingly, a principal object of the present invention is to simplify the construction of such an arrangement while at the same time increasing its reliability. Another object of the invention is to reduce the number of moving parts in such an arrangement thereby minimizing problems of wear and adjustment. Still another object of the invention is to incorporate such an improved arrangement in conjunction with a single straightforward electric switch element, whereby the switch is closed during movement of the reciprocating cam in one direction, and is opened during movement of the cam in the opposite direction. Another object is to provide in such arrangement a predetermined dwell in order to stabilize the system in which the cam controlled device is located.

These and other important objects of the invention will be readily apparent from the following detailed description, reference being made to the accompanying drawings in which like reference numerals refer to like elements and in which.

Figure 1:
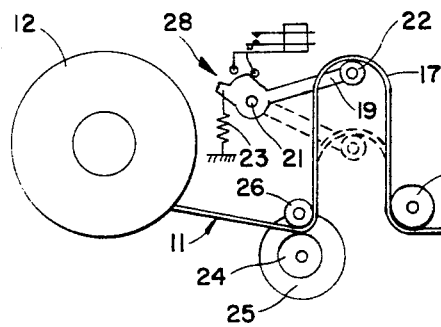
FIGURE 1 is a schematic elevational view of a free loop web feeding mechanism, illustrating a representative utilization of cam controlled devices according to the present invention.
Figure 2:
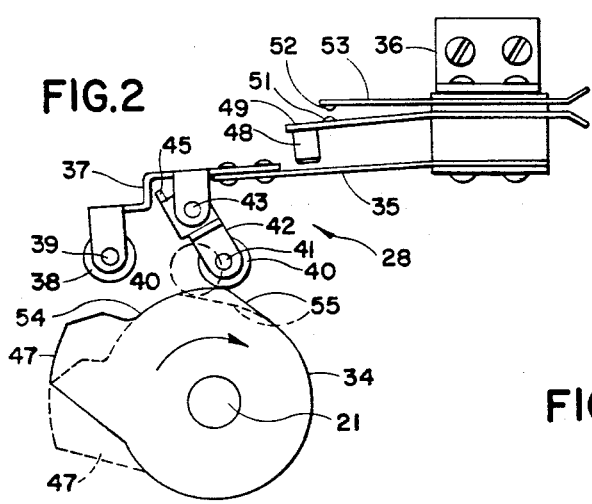
FIGURE 2 is a side view of a preferred embodiment of the present invention utilizing an electric switch, showing the switch in its open position during clockwise movement of the reciprocating cam, and illustrating, in broken lines, the extreme counterclockwise position of the cam and the corresponding position of one of the cam followers.

Referring now to the drawings, FIGURE 1 depicts a free loop web feeding mechanism which is illustrative of many different types of structures in which the subject invention might be employed. In this mechanism, an elongated web 11 of photographic film, paper or other material is fed from a supply reel 12 onto a take-up reel 13, with the movement of the portion 14 of the web, centrally located between the reels, being controlled by a drive roller 15, frictionally engaging the web in cooperation with pressure roller 16 and rotatably driven in a clockwise direction by an intermittently operable motor or other drive means, not shown. Such a mechanism might, for example, be employed in a photographic printer to intermittently advance a web of photographic paper past an exposure area in the location of portion 14 of the web. To maintain portion 14 of the web under a slight but substantially constant tension and to eliminate inertial influences of the supply and take-up reels on the movement of the web by drive roller 15, the mechanism is provided with means for establishing a first free loop 17 of web material ahead of the drive roller 15 and a second free loop 18 beyond roller 15, whereby the central portion 14 of the web is isolated from tension existing in the web beyond the free loops.

To maintain a length of web material at all times in the first free loop 17, a loop sensing arm 19, pivotally supported on shaft 21, carries a roller 22 in light engagement with the inner surface of the loop under the influence of a weak spring 23. Thus, the angular position of arm 19 is established by the size of the free loop 17, which, in turn, is controlled by a feed roller 24 rotatably driven by an intermittently operated motor 25 to advance web material into the free loop area by the frictional engagement of the web between feed roller 24 and a pressure idler roller 26 spaced from a freely rotatable guide roller 27 adjacent portion 14 of the web.

A cam controlled switching device is designated generally at 28 and is attached to shaft 21. As will be described hereinafter, this device is associated with a switch in series with motor 25, which switch is closed when the loop decreases in size sufficiently to move arm 19 to the position shown in broken lines, whereupon motor 25 is energized and drives roller 24 to feed web material into the loop area. As the loop enlarges, the switch remains closed until the arm returns to the position shown in solid lines, whereupon the switch is opened, terminating the advancement of web material into the loop. As the loop is depleted by the operation of roller 15, the switch remains open until the arm is again moved to the lower illustrated position.

Beyond drive roller 15 the size of the second free loop 18 is likewise controlled in a similar manner by means of a second loop sensing arm 19' connected to a second cam controlled switching device of the same general type to control the operation of a drive roller 31, located in advance of the take-up reel and connected to a motor 32. The take-up reel may simply be, driven through a frictional clutch by a motor, not shown, such frictional driving engagement being overpowered by the influence of drive roller 31 engaging the web by cooperation with an idler roller 33. Thus, when the second free loop reaches a pre-determined size, as shown in solid lines, roller 31 is driven to feed material from the loop toward the take-up reel until sufficient material has been absorbed to reduce the loop to the size shown in broken lines, whereupon motor 32 is de-energized and remains so until the pre-determined enlarged loop condition again occurs.

Figure 3:
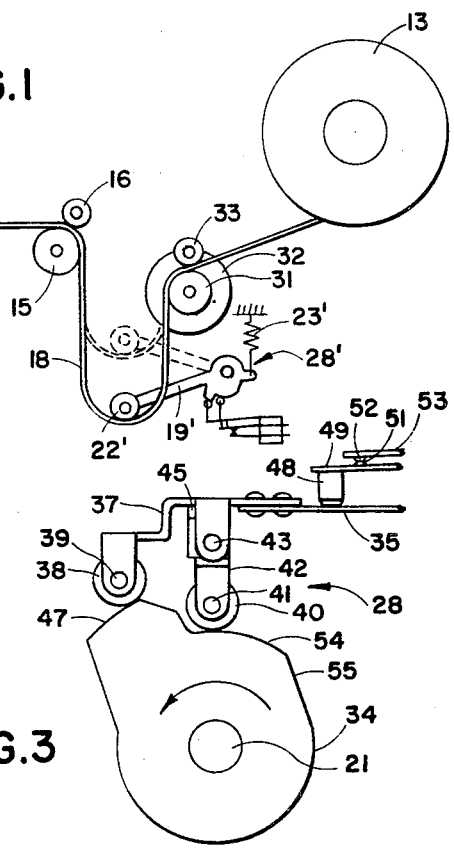
FIGURE 3 is a partial side view of the mechanism of FIGURE 2, showing the switch in the closed position which it assumes during counterclockwise movement of the cam.
Figure 4:
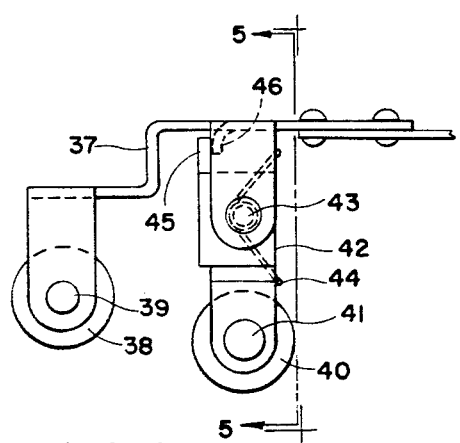
FIGURE 4 is an enlarged fragmentary side elevational view of the cam follower portion of the device shown in FIGURES 2 and 3.
Figure 5:
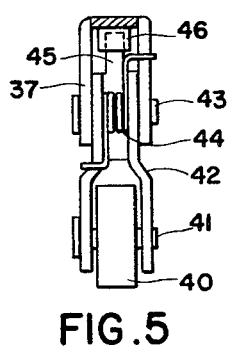
FIGURE 5 is a cross section end elevation taken along lines 5—5 of FIGURE 4.

The cam control device itself, as shown in detail in FIGURES 2 to 5, comprises a cam 34 attached to a rotatably reciprocative shaft 21. A resilient support arm 35 is mounted at one end in fixed relation to cam 34 by a bracket 36 and is attached at its opposite free end to a support element 37, which rotatably supports a fixed cam follower 38 pivotally mounted on a shaft 39. A second cam follower 40 is rotatably supported on shaft 41 at the lower end of bifurcated arm 42, the opposite end of which is pivotally attached to the support element 37 by a pin 43. The support element with its cam followers is normally biased by a resilient support arm 35 to the initial location shown in solid lines in FIGURE 2. While the cam followers are shown as comprising rollers, it is of course apparent that solid sliding cam followers could also be employed if preferred. A light wire spring 44, as shown in FIGURES 4 and 5, is wound about pin 43 and engages arm 42 and support element 37 to lightly urge arm 42 in a clockwise direction toward the operative position shown in FIGURES 3, 4 and 5, in which position further clockwise movement of the arm about pin 43 is prevented by the engagement of a tongue 45 on arm 42 with a depending lug 46 on element 37.

The cam 34 has at its periphery three follower engaging areas of successively varying radii. The outermost of these peripheral areas, shown at 47, is brought into engagement with cam follower 38 only when the cam is rotated to its extreme clockwise position, as shown in FIGURE 3. In this position, cam follower 38 has displaced support element 37 from its initial location sufficiently to flex support arm 35 into engagement with insulating member 48 on conductive contact strip 49. Strip 49 in turn is flexed so as to bring contact point 51 thereof into engagement with contact point 52 on conductive strip 53, thereby establishing a closed circuit through the switch comprised of the two conductive strips and their respective contact points, which are otherwise spaced from one another. At the same time, such displacement of element 37 enables spring 44 to move bifurcated arm 42 to the operative position shown in FIGURE 3, in which arm 42 is located along the line defined by pivot 43 and that point nearest pivot 43 on the intermediate generally arcuate peripheral area 54 of cam 33, in substantially right-angled relation to the portion of the cam surface engaged by cam follower 40. When the cam is thereafter rotated in a counterclockwise direction, as indicated by the arrow in FIGURE 3, area 47 moves out of contact with cam follower 38, but element 37 remains in substantially the same position, with contact points 51 and 52 remaining closed, by virtue of the operative engagement of cam follower 40 with the intermediate cam portion 54. However, as the counterclockwise movement of the cam continues to the position shown in broken lines in FIGURE 2, the third peripheral area 55 of the cam moves into engagement with cam follower 40, enabling element 37 to move toward the cam in return to its initial location to separate contact points 51 and 52, thereby opening the switch. When cam 34 is subsequently again rotated in its clockwise direction, as shown by the arrow in FIGURE 2, spring 44 is of insufficient strength to overcome the lateral force which is exerted on cam follower 40 by the cam, which moves arm 42 in a counterclockwise direction about pin 43 to the inoperative position shown in FIGURE 2. When this position of arm 42 has been established, the various components of the device remain in the position shown in FIGURE 2 until member 37 is again displaced to the position shown in FIGURE 3 by the engagement of cam follower 38 with the peripheral cam area 47 as the cam again approaches its extreme clockwise position as shown in FIGURE 3. To achieve this mode of operation, it is of course essential that spring 44 does not exert enough clockwise force on arm 42 to move the arm to its vertical position against the influence of arm 35 while the cam is in the position shown in FIGURE 2. However, once arm 42 assumes its operative position upon engagement of cam follower 38 with peripheral area 47 of the cam, the force exerted on arm 42 by the counterclockwise rotation of the cam tends to maintain it in that position. Accordingly, the spring need be only strong enough to insure positive movement of the arm to its operative position and may therefore be considerably weaker than the resilient force exerted toward the cam by resilient arm 35.

By providing the arangement as explained above, the system has high stability. When cam 34 moves in a clockwise direction, cam follower 40 is displaced against the force of spring 44 so that switch contacts 51 and 52 remain open as the cam continues to rotate. However, when the cam rotates in a counterclockwise direction, the switch contacts remain closed until cam follower 38 reaches portion 47 of cam 34. Accordingly, the operational state of the motor will not be changed unless there is an appreciable change in the size of the loop being sensed; in other words, the cam must rotate or reciprocate through a substantial predetermined angle before the motor will either be energized or de-energized.

While the illustrated embodiment of the invention relates to a device for operating an electric switch, it is apparent that the movement of the cam follower arm could likewise be employed to control the displacement of other types of mechanical components movable between two positions. Similarly, although reciprocative cam 34 is depicted as being rotatable and provided with a cam surface about its periphery, the invention might alternatively employ a face cam or any other appropriate type of cam, for example, a cam comprising a slidable member or the like. Since these and other modifications are within the spirit of the invention, the foregoing description is to be considered as illustrative only and not as limiting the scope of the invention, as defined by the appended claims.

I claim:
1. A cam actuated motion translating device comprising:
 (a) a reciprocative cam movable in one direction from a first position to a second position and in the opposite direction from said second position to said first position;
 (b) a displaceable member comprising a fixed cam follower and a movable cam follower, said displaceable member being biased toward an initial location;
 (c) first surface means on said reciprocative cam adapted to engage said fixed cam follower to displace said displaceable member away from said initial location when said reciprocative cam moves into said second position;
 (d) second surface means on said reciprocative cam;
 (e) means responsive to such displacement of said displaceable member for moving said movable cam follower to an operative position to maintain such displacement of said displaceable member during movement of said cam in said opposite direction by cooperation of said movable cam follower with said second surface means;
 (f) third surface means on said reciprocative cam engageable by said movable cam follower as said cam moves into said first position, whereby said displaceable member returns to its initial location, said third surface means also serving to move said movable cam follower to an inoperative position; and
 (g) means for maintaining said movable cam follower in said inoperative position during movement of said reciprocative cam in said one direction until said displaceable member is again displaced away from said initial location by said fixed cam follower upon movement of said cam into said second position.

2. A construction according to claim 1 in which said movable cam follower comprises an arm attached to said displaceable member by a pivot at one end thereof and having a cam engaging surface at its opposite end, said cam follower being pivotally movable between said operative position in which said cam engaging surface engages that portion of said second surface means nearest said pivot and said inoperative position in which said reciprocative cam engages a portion of said cam more remote from said pivot.

3. A construction according to claim 2 in which said movable cam follower in said operative position is disposed in relation to said cam and said displaceable member such that force exerted by said reciprocative cam against said movable cam follower during movement of said cam in said opposite direction tends to maintain said movable cam follower in said operative position.

4. A construction according to claim 1 including an electric switch having a contact element operatively connected to said displaceable member, whereby said switch is actuated in response to displacement of said displaceable member.

5. A cam actuated control device comprising:
 (a) a reciprocative cam movable in one direction from a first position to a second position and in the opposite direction from said second position to said first position;
 (b) a movable member;
 (c) a cam follower comprising an arm movably attached to said movable member for movement between an operative position in which said arm operatively connects said movable member to said reciprocative cam for movement thereby and an inoperative position in which said arm is inoperative to transmit motion to said movable member from said reciprocative cam;
 (d) enabling means operable by said reciprocative cam for moving said arm to said operative position when said reciprocative cam is proximate to said second position and for maintaining said arm in said operative position during movement of said cam in said opposite direction; and
 (e) disabling means operable by said reciprocative cam for moving said arm to said inoperative position when said reciprocative cam is proximate to said first position and for maintaining said arm in said inoperative position during movement of said cam in said one direction;
whereby said movable member is operatively connected to said reciprocative cam by said arm during movement of said reciprocative cam in said opposite direction and is operatively disconnected from said reciprocative cam during movement thereof in said one direction.

6. A cam actuated motion translating device comprising:
 (a) a reciprocative cam movable in one direction from a first position to a second position and in the opposite direction from said second position to said first position;
 (b) a movable member biased toward a first location and movable therefrom to a second location;
 (c) a first cam follower attached to said movable member;
 (d) first surface means defining a lobe on said reciprocative cam adapted to engage said first cam follower to move said movable member to said second location when said reciprocative cam moves into said second position;
 (e) a second cam follower movably attached to said movable member and movable between an operative position in which said second cam follower operatively connects said movable member to said reciprocative cam and an inoperative position in which said second cam follower is inoperative to transmit movement to said movable member from said reciprocative cam;
 (f) second surface means on said reciprocative cam for engaging said second cam follower to maintain said movable member in said second position during movement of said reciprocative cam while said cam follower is in said operative position;
 (g) enabling means for positioning said second cam follower in said operative position upon movement of said reciprocative cam into second position and for maintaining said second cam follower in such operative position during a substantial portion of the movement of said reciprocative cam in said reverse direction; and
 (h) disabling means comprising third surface means on said reciprocative cam adapted to engage said second cam follower upon movement of said cam into said first position, thereby enabling said movable member to move to said first location, said disabling means also serving to move said second cam follower ao said inoperative position and to maintain second cam follower in said inoperative position during a substantial portion of the subsequent movement of said reciprocative cam in said one direction.

References Cited

UNITED STATES PATENTS

| 1,832,665 | 11/1931 | Spaine | 74—54 |
| 2,260,199 | 10/1941 | Sinclair et al. | 74—54 XR |
| 2,603,096 | 7/1952 | Clark | 74—54 |
| 2,847,525 | 8/1958 | Everard | 200—153.13 XR |

FOREIGN PATENTS 1,031,399 6/1958 Germany.

ROBERT K. SCHAEFFER, *Primary Examiner.*

H. BURKS, *Assistant Examiner.*